(12) United States Patent
Matsuoka et al.

(10) Patent No.: US 6,414,064 B1
(45) Date of Patent: Jul. 2, 2002

(54) POLYAMIDE RESIN COMPOSITION

(75) Inventors: Hideharu Matsuoka; Hideaki Oka; Shigeru Sasaki, all of Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/949,908

(22) Filed: Sep. 12, 2001

(30) Foreign Application Priority Data

Sep. 12, 2000 (JP) .......................................... 2000-276350

(51) Int. Cl.$^7$ .......................... C08L 77/00; C08K 3/00; C08K 3/22
(52) U.S. Cl. ..................... 524/404; 523/200; 523/204; 523/205; 523/209; 524/405; 524/430; 524/431; 524/432; 524/433; 524/447; 524/504; 524/514; 525/66; 525/182
(58) Field of Search .................. 525/66, 182; 524/504, 524/374, 430, 431, 432, 433, 404, 405, 447, 483; 523/200

(56) References Cited

U.S. PATENT DOCUMENTS 5,354,802 A * 10/1994 Shiwaku et al. ............. 524/494
5,565,538 A    10/1996 Zingde et al. ............... 526/293

FOREIGN PATENT DOCUMENTS

| JP | 3-239755 | 10/1991 |
| JP | 4-96970 | 3/1992 |
| JP | 5-320503 | 12/1993 |
| JP | 6-263985 | 9/1994 |
| WO | WO 95/18178 | * 7/1995 |
| WO | WO 97/31063 | * 8/1997 |

* cited by examiner

*Primary Examiner*—Ana Woodward
(74) *Attorney, Agent, or Firm*—Oblon, Spivak, McClelland, Maier & Neustadt, P.C.

(57) ABSTRACT

The polyamide resin composition of the present invention comprises 100 parts by weight of a polyamide resin (A) having dicarboxylic acid units (a) comprising from 60 to 100 mol % of terephthalic acid repeat units and diamine units (b) comprising from 60 to 100 mol % of $C_{6-18}$ aliphatic alkylenediamine repeat units, and from 1 to 100 parts by weight of a polybromostyrene (B), comprising from 0.5 to 100% by weight of a polybromostyrene having an epoxy group. Molded articles prepared from the polyamide resin composition of the present invention have good flame retardancy, good chemical resistance, good surface appearance and good blistering resistance.

26 Claims, 1 Drawing Sheet

POLYAMIDE RESIN COMPOSITION

BACKGROUND OF THE INVENTION

1. Field of the Invention

The present invention relates to a polyamide resin composition and molded products made therefrom. The polyamide resin composition of the present invention has good flame retardancy, good chemical resistance, good surface appearance and good blistering resistance, and is therefore suitable for applications that require flame retardancy and good mechanical properties, for example, for industrial materials, engineering materials, household utensils, components of electric and electronic appliances, automobile parts, etc.

2. Description of the Related Art

Aliphatic polyamides such as nylon 6 and nylon 66 are widely used for engineering plastics because they have good heat resistance, good chemical resistance, high stiffness, good abrasion resistance and good moldability. In the field of electrical devices and electronics, engineering plastics are required to have high flame retardancy, and various methods of making them resistant to flames by adding various flame retardants have been proposed and put into commercial use. However, since aliphatic polyamides absorb water, articles molded from them vary in dimension and have changing physical properties (usually for the worse). The recent trend in the field of electrical devices and electronics is to require flame retardancy, due to the development of surface mounting techniques (SMT). However, conventional polyamide resins are unsuitable for SMT applications because their heat resistance is unsatisfactory.

Consequently, semiaromatic polyamides, which are polyamides consisting essentially of an aliphatic alkylenediamine reacted with terephthalic acid, have higher heat resistance, and are therefore used for electrical and electronic applications requiring flame retardancy. For example, JP-A 239755/1991, 96970/1992, 320503/1993 and 263985/1994, propose polyamide resin compositions comprising a semiaromatic polyamide and a polybromostyrene flame retardant. However, the semiaromatic polyamide has poor compatibility with the polybromostyrene, and therefore the polybromostyrene flame retardant is not well dispersed in the resin compositions. As a result, molded products prepared from such polyamide resin compositions often have the problem of low chemical resistance and a surface which is often peeled and roughened. These problems are serious in colored molded products, because the roughened surface is whitish and has a poor appearance.

SUMMARY OF THE INVENTION

Accordingly, it is an object of the present invention to provide a polyamide resin composition, and molded articles prepared therefrom, having good flame retardancy, good chemical resistance, good surface appearance and good blistering resistance. Polyamide resin compositions having good flame retardancy, good chemical resistance, good surface appearance and good blistering resistance can be prepared by adding a polybromostyrene having an epoxy group, to a semiaromatic polyamide. Specifically, the present invention is polyamide resin composition comprising 100 parts by weight of a polyamide resin (A), that comprises repeat units derived from a dicarboxylic acid (a), which comprises from 60 to 100 mol % of repeat units derived from terephthalic acid, and repeat units derived from a diamine (b), which comprises from 60 to 100 mol % of repeat units derived from a $C_{6-18}$ aliphatic alkylenediamine, and from 1 to 100 parts by weight of a polybromostyrene (B), in which from 0.5 to 100% by weight of the polybromostyrene (B) is a polybromostyrene having an epoxy group.

It is another object of the present invention to provide molded articles of the polyamide resin composition of the present invention.

DETAILED DESCRIPTION OF THE PREFERRED EMBODIMENTS

Figure 1:
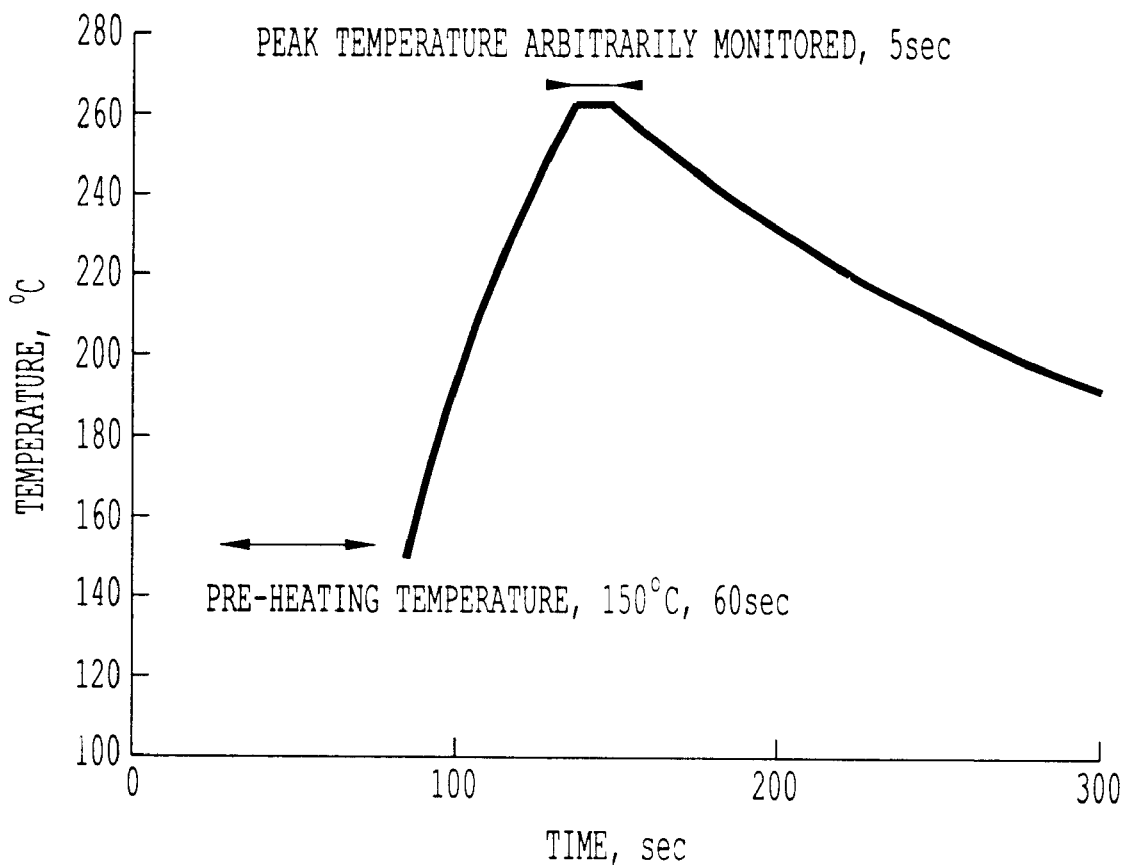
FIG. 1 is a graph of a temperature profile of test pieces heated in an IR furnace.

The polyamide resin (A) comprises repeat units derived from a dicarboxylic acid (a), which comprises from 60 to 100 mol % of a repeat unit derived from terephthalic acid, preferably from 75 to 100 mol %, more preferably from 90 to 100 mol % thereof. If the content of repeat units derived from terephthalic acid of the polyamide resin (A) is smaller than 60 mol %, the heat resistance of the resulting polyamide resin composition is low. The term "repeat unit derived from terephthalic acid," for example, refers to a repeat unit having a terephthalic acid structure (i.e., a 1,4-benzene dicarboxyl structure) in the backbone of the polyamide. Such a repeat unit structure would be obtained, for example, by polymerizing any of various derivatives of terephthalic acid, such as the dimethyl ester or diacid chloride of terephthalic acid.

The dicarboxylic acid repeat units (a) may comprise at most 40 mol % of any other dicarboxylic acid repeat units, other than terephthalic acid repeat units. The other dicarboxylic acid repeat units may include, for example, repeat units derived from aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid. The actual monomer polymerized to provide the ultimate polyamide may be a dicarboxylic acid, an ester, an anhydride, or an acid halide thereof, or any other derivative of a dicarboxylic acid which may be polymerized with a diamine to provide a polyamide polymer. The polyamide resin may contain one or more types of these additional repeat units. The preferred additional repeat units comprise those derived from aromatic dicarboxylic acids. The additional dicarboxylic acid repeat unit content of the polyamide resin is preferably at most 25 mol %, more preferably at most 10 mol %. If desired, the polyamide resin may further comprise repeat units derived from polycarboxylic acids such as trimellitic acid, trimesic acid and pyromellitic acid, as long as the ultimate polyamide resin composition may be processed by conventional melt processing methods to provide a molded article.

The diamine units (b) of which the polyamide resin (A) is comprised, may comprise from 60 to 100 mol % of $C_{6-18}$ aliphatic alkylenediamine repeat units, preferably from 75 to 100 mol %, more preferably from 90 to 100 mol % thereof.

If the $C_{6-18}$ aliphatic alkylenediamine repeat unit content of the polyamide resin (A) is smaller than 60 mol %, the properties, including the heat resistance, the water absorption resistance, and the chemical resistance of the resulting polyamide resin composition are poor. The $C_{6-18}$ aliphatic alkylenediamine units include, for example, repeat units derived from linear aliphatic alkylenediamines such as 1,6-hexanediamine, 1,7-heptanediamine, 1,8-octanediamine, 1,9-nonanediamine, 1,10-decanediamine, 1,11-undecanediamine and 1,12-dodecanediamine; branched aliphatic alkylenediamines such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine and 5-methyl-1,9-nonanediamine. The polyamide resin may contain one or more types of these repeat units. The preferred diamine repeat units are derived from 1,6-hexanediamine, 1,8-octanediamine, 2-methyl-1,8-octanediamine, 1,9-nonanediamine, 1,10-decanediamine, 1,11-undecanediamine and 1,12-dodecanediamine, and more preferred diamine repeat units are 1,9-nonanediamine repeat units and/or 2-methyl-1,8-octanediamine repeat units. If 1,9-nonanediamine repeat units and 2-methyl-1,8-octanediamine repeat units are combined in the polyamide resin, it is preferred that the mole ratio of 1,9-nonanediamine repeat units to 2-methyl-1,8-octanediamine repeat units falls between 99/1 and 1/99, more preferably between 95/5 and 40/60, even more preferably between 90/10 and 80/20. Polyamide resin compositions comprising a polyamide resin having a mole ratio of 1,9-nonanediamine repeat units to 2-methyl-1,8-octanediamine repeat units as defined above are preferred, because they have better heat resistance, better moldability, better water absorption resistance and better surface appearance.

The diamine repeat units (b) may comprise at most 40 mol % of any other diamine repeat units other than $C_{6-18}$ aliphatic alkylenediamine repeat units. These other diamine repeat units may include, for example, diamine repeat units derived from aliphatic diamines such as ethylenediamine, propanediamine and 1,4-butanediamine; alicyclic diamines such as cyclohexanediamine; methylcyclohexanediamine, isophoronediamine, norbornanedimethylamine and tricyclodecanedimethylamine; aromatic diamines such as p-phenylenediamine, m-phenylenediamine, p-xylylenediamine, m-xylylenediamine, 4,4'-diaminodiphenylmethane, 4,4'-diaminodiphenyl sulfone and 4,4'-diaminodiphenyl ether. The polyamide resin may contain one or more types of these additional repeat units. The additional diamine repeat unit content of the polyamide resin is preferably at most 25 mol %, more preferably at most 10 mol %.

Preferably, at least 10% of the terminal groups in the molecular chains of the polyamide resin (A) of the present invention are blocked with a terminal-blocking agent. More preferably, in the molecular chains of the polyamide resin (A), the amount of the terminal groups blocked with a terminal-blocking agent (degree of terminal-blocking) is at least 40%, even more preferably at least 70%. Polyamide resin composition in which the polyamide resin has a degree of terminal-blocking of at least 10% has better physical properties, for example, better melt moldability and better surface appearance.

The degree of terminal-blocking in the polyamide resin (A) can be determined by counting the number of the terminal carboxyl groups, the number of terminal amino groups and the number of terminal groups blocked with a terminal-blocking agent. Specifically, the degree of terminal-blocking may be calculated from the following formula (1). In order to obtain accurate results, in an easy manner, the number of the terminal groups in the polyamide resin may be obtained by $^1$H-NMR, by separately integrating the specific signals corresponding to the terminal groups.

$$\text{Degree of Terminal-Blocking (\%)} = [(X-Y)/X]100 \qquad (1),$$

wherein X is the total number of all terminal groups in the molecular chains of the polyamide resin (in general, this is equal to two times the number of the polyamide molecules), and Y is the total number of both the terminal carboxyl groups and the terminal amino groups in the molecular chains of the polyamide resin.

The terminal-blocking agent for use herein is not specifically defined, and may be any monofunctional compound reactive with the terminal amino or carboxyl groups of a polyamide. Preferred terminal-blocking agents are monocarboxylic acids and monoamines, since their reactivity is high and since they form stable terminals groups on polyamides. More preferred terminal-blocking agents are monocarboxylic acids, since they are easy to handle. In addition, acid anhydrides such as phthalic anhydride, as well as monoisocyanates, mono-acid halides, monoesters and monoalcohols, may also be used.

Suitable monocarboxylic acids may include any monocarboxylic acid which is reactive with amino groups. For example, such monocarboxylic acids may include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, methylnaphthalenecarboxylic acid and phenylacetic acid; and mixtures of any of the above monocarboxylic acids. Preferred monocarboxylic acids include acetic acid, propionic acid, butyric acid, valeric acid, caproic acid, caprylic acid, lauric acid, tridecanoic acid, myristic acid, palmitic acid, stearic acid and benzoic acid, because of their relatively high reactivity, low cost, and the stability of the terminal-blocking group formed.

Suitable monoamines may include any monoamine which is reactive with carboxyl groups. For example, such monoamines may include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and mixtures of any of the above monoamines. Preferred monoamines include butylamine, hexylamine, octylamine, decylamine, stearylamine, cyclohexylamine and aniline, because they are highly reactive and inexpensive and have a high boiling point, and form stable terminal-blocking groups.

The polyamide resin (A) of the present invention may be produced by any method known for producing crystalline polyamides. For example, it may be produced by solution polymerization or interfacial polymerization starting from acid chlorides and diamines, or by melt polymerization, solid-phase polymerization or melt-extrusion polymerization starting from dicarboxylic acids and diamines.

An example of a process for preparing the polyamide resin (A) is as follows. A diamine, a dicarboxylic acid, a catalyst and optionally a terminal-blocking agent are fed into a reactor at the same time to prepare a nylon salt, which is then heated and polymerized at 200 to 250° C. to give a prepolymer having an intrinsic viscosity [η] in concentrated sulfuric acid at 30° C. of from 0.1 to 0.6 dl/g. The prepolymer is then further polymerized in the solid phase or by melt extrusion to form a polyamide resin. The preferred polymerization process forms a prepolymer having an intrinsic viscosity [η] falling between 0.1 and 0.6 dl/g, in order to provide a proper molar balance of carboxyl groups and amino groups in the latter-stages of the polymerization, and to maintain a sufficient rate of polymerization. Such polymerization processes form polyamide resins having a narrower molecular weight distribution, better physical properties, and better moldability. If the final polymerization is carried out in the solid phase, the reaction pressure is preferably reduced, or an inert gas flow is introduced into the reaction system. Also, it is preferred that the reaction temperature be controlled to fall between 200 and 280° C. to further increase the rate of polymerization. In this manner, the productivity of the polymerization process may be increased, and the polyamide resins produced thereby are less likely to become yellowed or gelled. If the final stage of the polymerization is carried out by melt-extrusion, the polymerization temperature is preferably not higher than 370° C., so that good quality polyamide resins are produced with little degradation.

A catalyst may be used in the process for producing the polyamide resin (A), in addition to the above-mentioned terminal-blocking agent. For example, such catalysts may include phosphoric acid, phosphorous acid, hypophosphorous acid, and their salts and esters. The salts and esters include, for example, salts of phosphoric acid, phosphorous acid or hypophosphorous acid with a metal such as potassium, sodium, magnesium, vanadium, calcium, zinc, cobalt, manganese, tin, tungsten, germanium, titanium or antimony; ammonium phosphate, phosphite or hypophosphite; as well as ethyl, isopropyl, butyl, hexyl, isodecyl, octadecyl, decyl, stearyl or phenyl phosphate, phosphite or hypophosphite.

Preferably, the intrinsic viscosity [η] of the polyamide resin (A) of the present invention, measured in concentrated sulfuric acid at 30° C., falls between 0.4 and 3.0 dl/g, more preferably between 0.5 and 2.0 dl/g, even more preferably between 0.6 and 1.5 dl/g. The preferred polyamide resin (A) having a limiting viscosity falling within the range described above provides preferred moldings having better mechanical properties and better heat resistance.

The polyamide resin composition of the present invention comprises, in addition to the polyamide resin (A), a polybromostyrene (B), of which from 0.5 to 100% by weight of the polybromostyrene (B) is a polybromostyrene having an epoxy group (hereinafter referred to as "epoxy-containing polybromostyrene"). The polybromostyrene of the present invention includes those obtained by polymerizing a styrene monomer to give a polystyrene followed by brominating the polystyrene; and those obtained by polymerizing a bromostyrene monomer.

The preferred epoxy-containing polybromostyrene is a polybromostyrene comprising epoxy-containing repeat units. Such epoxy-containing repeat units may be, for example, those derived from glycidyl acrylate, glycidyl methacrylate, glycidyl itaconate, allyl glycidyl ether, 2-methylallyl glycidyl ether, styrene-p-glycidyl ether, 3,4-epoxybutene, 3,4-epoxy-3-methyl-1-butene, 3,4-epoxy-3-methyl-1-pentene, 5,6-epoxy-1-hexene, vinylcylohexene monoxide and p-glycidylstyrene. The preferred epoxy-containing repeat units are derived from glycidyl acrylate and glycidyl methacrylate. The polybromostyrene may contain one or more of these repeat units.

The epoxy-containing repeat unit content of the epoxy-containing polybromostyrene preferably falls between 0.05 and 20 mol %, more preferably between 0.1 and 20 mol %, even more preferably between 0.5 and 20 mol % of all the repeat units of the polybromostyrene. If the epoxy-containing repeat unit content thereof is smaller than 0.05 mol %, the epoxy-containing polybromostyrene has poor compatibility with the polyamide resin (A), and the resulting polyamide resin composition will not have good mechanical properties and molded articles prepared therefore will have poor appearance. If the epoxy-containing repeat unit content of the polybromostyrene is larger than 20 mol %, the mixture of the polyamide resin (A) and polybromostyrene will have a high melt viscosity.

The polybromostyrene comprising epoxy-containing repeat units, such as those described above, may be produced by various methods. For example, <1> a method comprising polymerizing a styrene monomer to provide a polystyrene, then brominating the polystyrene, and thereafter grafting an epoxy-containing monomer to the brominated polystyrene; <2> a method comprising polymerizing a styrene monomer to provide a polystyrene, then grafting an epoxy-containing monomer to the polystyrene, and thereafter brominating the resulting polymer; <3> a method comprising copolymerizing a styrene monomer with an epoxy-containing monomer, and then brominating the resulting polymer; <4> a method comprising polymerizing a bromostyrene monomer to prepare a bromostyrene polymer, and then grafting an epoxy-containing monomer to the polymer; or <5> a method comprising copolymerizing a bromostyrene monomer with an epoxy-containing monomer. In any of the above methods, the copolymerization may random copolymerization, block copolymerization or alternate copolymerization. The preferred methods are methods <1>, <4> and <5>, because of the thermal stability of the products; and more preferred methods are methods <4> and <5>.

The proportion of the epoxy-containing polybromostyrene in the polybromostyrene (B) falls between 0.5 and 100% by weight, but preferably between 5 and 100% by weight, based on the total weight of the polybromostyrene (B). Polyamide resin compositions which have the polybromostyrene with an amount of epoxy-containing polybromostyrene falling within the ranges described above have good chemical resistance, and molded articles prepared therefrom have good surface appearance.

Preferably, the molecular weight ($M_w$) of the polybromostyrene (B) falls between 5,000 and 500,000, more preferably between 10,000 and 400,000. If the molecular weight of the polybromostyrene (B) is less than 5,000, the heat resistance of the polyamide resin composition containing the polybromostyrene (B) will be low; but if the molecular weight is larger than 500,000, the melt viscosity of a polyamide resin composition containing the polybromostyrene (B) will be high.

Preferably, the bromine content of the polybromostyrene (B) falls between 50 and 80% by weight, more preferably between 55 and 75% by weight, based on the total weight of the polybromostyrene (B). If the bromine content is smaller than 50% by weight, a large amount of the polybromostyrene (B) must be added to the polyamide resin composition in order for the resin composition to be satisfactorily flame resistant, and the large amount of polybromostyrene will degrade the mechanical properties of the resin composition. On the other hand, if the bromine content of the polybromostyrene (B) is higher than 80% by weight, the heat resistance of the polyamide resin composition will be low.

The polyamide resin composition of the present invention comprises from 1 to 100 parts by weight of the polybromostyrene (B), relative to 100 parts by weight of the polyamide resin (A), preferably from 10 to 80 parts by weight of the polybromostyrene (B). If the content of the polybromostyrene (B) is smaller than 1 part by weight, the flame retardancy of the polyamide resin composition is low; but if the polybromostyrene content is larger than 100 parts by weight, the chemical resistance, the mechanical properties and the thermal properties of the polyamide resin composition are poor.

Preferably, the polybromostyrene (B) is dispersed in the polyamide resin (A), to form a dispersed phase having a mean dispersion particle size of at most 3 µm in a continuous phase of the polyamide resin. More preferably, the mean dispersion particle size of the dispersed phase is at most 2 µm. The polyamide resin phase and the polybromostyrene phase may also be completely mixed with each other to form a single, homogeneous phase. Injection molded articles prepared from the polyamide resin composition of the present invention, in which the mean dispersion particle size of the dispersed phase falls within the range defined as above, do not have roughened surfaces, and when colored, do not have a whitish color.

If desired, the polyamide resin composition of the present invention may contain a flame-retardant synergist (C) and/or a filler (D). The flame-retardant synergist (C) may include, for example, antimony trioxide, antimony pentoxide, sodium antimonate, sodium oxide, tin oxide, zinc stannate, zinc oxide, iron oxide, magnesium hydroxide, calcium hydroxide, zinc borate, kaolin clay and calcium carbonate, or mixtures thereof. These flame-retardant synergists (C) may be processed with silane couplers and/or titanium couplers. The preferred flame-retardant synergists (C) are zinc borate and zinc stannate. The amount of the flame-retardant synergist (C) in the resin composition preferably falls between 0.1 and 50 parts by weight, more preferably between 1 and 30 parts by weight, relative to 100 parts by weight of the polyamide resin (A) in the resin composition. A polyamide resin composition containing such a flame-retardant synergist may have better flame retardancy even though it has a low flame retardant content.

The polyamide resin composition of the present invention may optionally contain a filler (D), which may have any form, for example fibers, powders or cloths. Fibrous fillers may include, for example, organic fibrous fillers such as totally aromatic polyamide fibers and totally aromatic liquid-crystal polyester fibers, for example, polyparaphenylene-terephthalamide fibers, polymetaphenylene-terephthalamide fibers, polyparaphenylene-isophthalamide fibers, polymetaphenylene-isophthalamide fibers, and fibers obtained from condensates of diaminodiphenyl ether and terephthalic or isophthalic acid; and inorganic fibrous fillers such as glass fibers, carbon fibers and boron fibers. Adding such a fibrous filler to the polyamide resin composition of the invention increases the mechanical strength, and improves the dimension stability and the water-absorption resistance of molded articles prepared from such compositions. Accordingly, the polyamide resin composition of the present invention preferably contains fibrous fillers. Preferably, the mean length of the fibrous filler falls between 0.05 and 50 mm. More preferably, it falls between 1 and 10 mm, because fibrous fillers of this dimension significantly improve the moldability of the polyamide resin composition, and in addition, also improve the sliding properties, the heat resistance and the mechanical properties of molded articles prepared therefrom. The fibrous filler may also be fabricated into cloth.

Powdery fillers may include, for example, silica, silica-alumina, alumina, titanium oxide, zinc oxide, boron nitride, talc, mica, potassium titanate, calcium silicate, magnesium sulfate, aluminum borate, asbestos, glass beads, carbon black, graphite, molybdenum disulfide and polytetrafluoroethylene. Preferably, the powdery filler has a mean particle size of from 0.1 to 200 µm, more preferably from 1 to 100 µm. The powdery filler improves the dimension stability, the mechanical properties, the heat resistance, the chemical properties, the physical properties and the sliding properties of molded articles comprised of polyamide resin compositions containing such fillers.

The filler (D) may comprise one or more of the fillers described above, either as a single filler, or as a combination of fillers. Preferably, the amount of the filler (D) in the polyamide resin composition of the present invention falls between 0.1 and 200 parts by weight, more preferably between 0.1 and 150 parts by weight, even more preferably between 0.5 and 100 parts by weight, relative to 100 parts by weight of the polyamide resin (A) in the composition. The polyamide resin composition containing an amount of filler within the range as defined above has improved moldability and better mechanical properties. In order to improve its dispersibility in the polyamide resin, the filler may preferably be surface treated with, for example, any silane coupling agent, titanium coupling agent, or other high-molecular weight or low-molecular weight surface-treating agent, or combination of surface-treating agents.

The polyamide resin composition of the present invention may optionally contain an acid absorber, for example a hydrotalcite; other different types of polymers such as polyphenylene sulfides, polyolefins, polyesters, aliphatic polyamides, polyphenylene oxides and liquid-crystal polymers; colorants; UV absorbents; light stabilizers; antioxidants such as hindered phenols, thio compounds, phosphorus-containing compounds and amines; antistatic agents; nucleating agents; plasticizers; mold release agents; and lubricants.

The polyamide resin composition of the present invention may be produced by mixing the polyamide resin (A), the polybromostyrene (B), optional ingredients of flame-retardant synergist (C) and filler (D), and other optional additives such as those discussed above. The polybromostyrene (B) may be added to the reaction system in which the polyamide resin (A) is prepared by polycondensation; the polybromostyrene (B) and other optional ingredients may be either blended into the polyamide resin (A) as dry ingredients; or the polyamide resin (A), polybromostyrene (B), and optional ingredients (e.g., flame-retardant synergist (C) or filler (D) may be kneaded together as a melt in an extruder. In general, melt kneading the components of the composition of the present invention in an extruder is preferred. The preferred type of extruder is a twin-screw extruder, and the melt temperature at which the components are kneaded as a melt is preferably maintained between 280 and 340° C.

The polyamide resin composition of the present invention may be molded into molded articles of different shapes using any conventional molding method generally employed for molding ordinary thermoplastic resin compositions. Such molding methods may include, for example, injection molding, extrusion molding, press molding, blow molding, calender molding or cast molding. For example, to obtain molded articles of a predetermined shape, the polyamide resin composition of the present invention may be melted in the cylinder of an injection-molding machine which has a cylinder temperature falling between the melting point of the polyamide resin and 350° C. The melt is then introduced (injected) into a mold having a predetermined shape. To obtain fibrous molded articles, the polyamide resin composition of the present invention may be melted in an extruder having a cylinder temperature falling within the range defined as above, and then spinning the melt out through the spinneret nozzle of the extruder. To obtain film or sheet molded articles, the polyamide resin composition of the present invention may be melted in an extruder having a cylinder temperature falling within the range defined as above, and then the melt is extruded out through the T-die of the extruder. The molded articles thus produced according to any of the methods discussed above may be coated with paint, metal, or another different type of polymer, to form a coated layer on the surface of the molded article.

EXAMPLES

Having generally described the present invention, a further understanding may be obtained by reference to certain specific examples which are provided herein for purposes of illustration only, and are not intended to be limiting unless otherwise specified. In the Examples, the mean dispersion particle size of the flame retardants used, and the flame retardancy, the chemical resistance and the blistering resistance of the samples produced were measured and tested according to the methods described below.

Mean Dispersion Particle Size of Organic Halogen Compound

A molded sample to be tested is frozen and cut. The cut surface is then etched in chloroform at 80° C. for 1 hour. The etched surface is analyzed with a scanning electronic microscope, and SEM pictures thereof are taken. The dispersion particle size, d, and the number of particles, n, are determined from the photograph, and the mean particle size of the dispersed phase is obtained according to the following equation.

$$\text{Mean Particle Size} = (\Sigma d^4 \cdot n)/(\Sigma d^3 \cdot n)$$

Flame Retardancy

Flame retardancy is measured according to the UL-94 Standards in the manner described below. A 1 mm thick test piece prepared by injection molding is vertically fixed so that its top end is clamped. The bottom end is exposed to a predetermined flame for 10 seconds, after which the flame is removed. The burn time of the test piece is then measured (first test). After the test piece has spontaneously extinguished, its bottom end is again exposed to the flame, the flame is subsequently removed, and the burn time of the test piece is measured (second test). Five test pieces of one sample are subjected to the same flame test as described above. Five measurements of the burn time for the first test and second test are obtained—that is, 10 data points are thus obtained for each sample. The sum of these 10 data points are represented by T, and the maximum value thereof is represented by M. The samples having a T value of up to 50 seconds and an M value of up to 10 seconds, which did not burn to the clamped top end, and which, when the burnt melt from the test piece dropped onto a cotton cloth (disposed at a position 12 inches below the test piece) did not ignite the cotton cloth, are ranked as having a flame retardancy rating of "V-0." Samples having a T value of up to 250 seconds and an M value of up to 30 seconds, and otherwise have the same other properties as those samples having a "V-0" rating, are ranked as having a flame retardancy rating of "V-1." Samples having a T value of up to 250 seconds and an M value of up to 30 seconds, which did not burn to the clamped top end, but in which the burnt melt of the test piece dropped onto and ignited a cotton cloth (this is disposed at a position of 12 inches below the test piece), are ranked as having a flame retardancy rating of "V-2."

Chemical Resistance (Mechanical Properties)

JIS No. 2 test pieces obtained by injection molding are dipped in methylene chloride for 168 hours. After being dipped, the tensile strength of each test piece is measured using the tensile strength test method of ASTM D638.

Chemical Resistance (Appearance)

JIS No. 2 test pieces obtained by injection molding are dipped in methylene chloride for 168 hours. After being dipped, the appearance of each test piece is visually checked. The samples with no surface change are rated as good "O"; and those in which the surface became whitish are rated as bad "x".

Appearance of Molded Articles

Molded articles having a size of 10 cm (length)×4 cm (width)×1 mm (thickness) are prepared by injection molding, and their appearance (e.g., color, surface condition) are visually checked. The samples which do not have a whitish appearance and have a smooth and uniform surface are rated as "good"; and those which have a whitish appearance or a rough and non-uniform surface are rated as "bad."

Blistering Resistance

Molded articles having a size of 0.5 mm (thickness)×10 mm (width)×30 mm (length) are prepared by injection molding, and conditioned at 40° C. and 50% RH for 72 hours. These are reflowed in an IR furnace (Sanyo Seiko's SMT Scope), having the temperature profile described in FIG. 1. A temperature sensor is fitted to the sample tested, and the temperature profile of the sample is measured. In FIG. 1, the monitored peak temperature falls between 240° C. and 270° C., and the sample is monitored at intervals of 5° C. After the reflow test, the appearance of the samples is checked. The critical temperature at which the sample tested is neither melted nor blistered is the blistering-resistant temperature of the sample. By blistering, we mean that the surface of the test sample is swollen to form blisters. Samples which exhibit blistering at a temperature lower than 250° C. are rated as bad "x"; those blistering at a temperature falling between 250 and 260° C. are rated as average "Δ"; and all others are rated as good "O".

In the following Examples, Comparative Examples and Reference Examples, the polyamide resins used are as follows:

PA9MT

This is a polyamide resin in which the dicarboxylic acid units are all terephthalic acid units and the diamine units are comprised of 1,9-nonanediamine units and 2-methyl-1,8-octanediamine units (in a molar ratio of 1,9-nonanediamine units/2-methyl-1,8-octanediamine units of 85/15), and which has an intrinsic viscosity [η] of 1.00 dl/g, a melting point of 308° C. and a degree of terminal-blocking of 90% (with benzoic acid as the terminal-blocking agent).

PA6IT

This is a polyamide resin in which the dicarboxylic acid units are composed of terephthalic acid units and isophthalic acid units (in a molar ratio of terephthalic acid units/isophthalic acid units of 60/40) and the diamine units are all 1,6-hexanediamine units, and which has a melting point of 312° C., an intrinsic viscosity [η] of 1.02 dl/g and a degree of terminal-blocking of 91% (with benzoic acid as the terminal-blocking agent).

Examples 1 to 5

The polyamide resin was premixed with a polybromostyrene containing 2.0 mol % of glycidyl methacrylate added thereto (hereinafter referred to as "GMA-PBrS"), a polybromostyrene (PBS-64, made by Great Lakes Chemical, hereinafter referred to as "PBrS"), zinc borate (Fire Break 415, made by Borax), a mixture of sodium oxide and antimony pentoxide (Sun-Epoc NA-1070L, made by Nissan Chemical), zinc stannate (FLAMTARD-S, made by Nippon Light Metal) and glass fibers (CS-3J-256S, made by Nitto Boseki), in the ratios indicated in the following Table 1. The resulting mixture was fed into a twin-screw extruder (TEX44C, made by Nippon Seikosho), kneaded in melt at a cylinder temperature of 320° C., extruded, then cooled and cut into pellets. The pellets were then molded in an injection molding machine (cylinder temperature 330° C.; mold temperature 150° C.), and the resulting molded articles were tested according to the methods described above. The test results are shown in Table 1.

Comparative Examples 1 and 2

In the same manner as in Examples 1 to 5, the same components, except GMA-PBrS, were mixed in the ratio indicated in Table 1 below, and pelletized. The pellets were then molded in an injection molding machine (cylinder temperature 330° C.; mold temperature 150° C.), and the resulting molded articles were tested according to the methods described above. The test results are shown in Table 1.

Comparative Example 3

PA66 (Leona 1300S, made by Asahi Chemical) was pre-mixed with GMA-PBrS, a mixture of sodium oxide and antimony pentoxide (Sun-Epoc NA-1070L, made by Nissan Chemical) and glass fibers (CS-3J-256S, made by Nitto Boseki) in the ratio indicated in Table 1, below. The resulting mixture was fed into a twin-screw extruder (TEX44C, made by Nippon Seikosho), kneaded in melt at a cylinder temperature of 280° C., extruded, then cooled and cut into pellets. The pellets were molded in an injection molding machine (cylinder temperature 280° C.; mold temperature 80° C.), and the resulting molded articles were tested according to the methods described above. The test results are shown in Table 1.

TABLE 1

|  | Example 1 | Example 2 | Example 3 | Example 4 | Example 5 | Comp. Ex. 1 | Comp. Ex. 2 | Comp. Ex. 3 |
| --- | --- | --- | --- | --- | --- | --- | --- | --- |
| PA9MT (wt. pts) | 100 |  | 100 | 100 | 100 | 100 |  |  |
| PA6IT (wt. pts) |  | 100 |  |  |  |  | 100 |  |
| PA66 (wt. pts) |  |  |  |  |  |  |  | 100 |
| GMA-PBrS (wt. pts) | 68 | 68 | 68 | 68 | 34 |  |  | 68 |
| PBrS (wt. pts) |  |  |  |  | 34 | 68 | 68 |  |
| Zinc Borate (wt. pts) | 14 | 14 |  |  | 14 | 14 | 14 |  |
| $Na_2O/Sb_2O_5$ (wt. pts) |  |  | 14 |  |  |  |  | 14 |
| Zinc Stannate (wt. pts) |  |  |  | 14 |  |  |  |  |
| Glass Fibers (wt. pts) | 89 | 89 | 89 | 89 | 89 | 89 | 89 | 89 |
| Mean Dispersion Particle Size (μm) | 0.6 | 0.7 | 0.6 | 0.6 | 0.8 | 2.8 | 3.0 | 1.0 |
| Flame Retardancy | V-0 | V-0 | V-0 | V-0 | V-0 | V-0 | V-0 | V-0 |
| Chemical Resistance 1 (strength retentiveness) | 100 | 97 | 100 | 100 | 100 | 96 | 90 | 65 |
| Chemical Resistance 2 (appearance of moldings) | ○ | ○ | ○ | ○ | ○ | x | x | x |
| Appearance of Moldings | Good | Good | Good | Good | Good | Bad | Bad | Good |
| Blistering Resistance | ○ | Δ | ○ | ○ | ○ | ○ | Δ | x |

From the results shown in Table 1 above, the polyamide resin compositions of Examples 1 to 5, which contain a semiaromatic polyamide and an epoxy-containing polybromostyrene in the ratio according to the present invention, have better properties than do the compositions of Comparative Examples 1 and 2, which do not contain an epoxy-containing polybromostyrene, in that the mean dispersion particle size of the dispersed phase in the compositions of Examples 1 to 5 is small, and theirs chemical resistance and surface appearance are excellent.

In addition, the polyamide resin compositions of Examples 1 to 5 are superior to the composition of Comparative Example 3, which contains an aliphatic polyamide resin rather than a semiaromatic polyamide resin, in that the chemical resistance and blistering resistance of the compositions of Examples 1 to 5 are excellent.

The present invention thus provides excellent polyamide resin compositions, and molded articles thereof, having good flame retardancy, good chemical resistance, good surface appearance and good blistering resistance.

While the invention has been described in detail and with reference to specific embodiments thereof, it will be apparent to one skilled in the art that various changes and modifications can be made therein without departing from the spirit and scope thereof. Obviously, numerous modifications and variations on the present invention are possible in light of the above teachings. It is therefore to be understood that within the scope of the appended claims, the invention may be practiced otherwise than as specifically described herein.

The priority document of the present application, Japanese application 276350/2000, filed Sep. 12, 2000, is incorporated herein by reference.

What is claimed as new and is intended to be secured by Letters Patent is:

1. A polyamide resin composition comprising:
   100 parts by weight of a polyamide resin (A) having repeat units comprising:
   dicarboxylic acid repeat units (a) comprising from 60 to 100 mol % of a terephthalic acid repeat unit; and
   diamine repeat units (b) comprising from 60 to 100 mol % of a $C_{6-18}$ aliphatic alkylenediamine repeat unit; and
   1 to 100 parts by weight of a polybromostyrene (B) comprising from 0.5 to 100% by weight of a polybromostyrene having an epoxy group.

2. The polyamide resin composition of claim 1, wherein the $C_{6-18}$ aliphatic alkylenediamine repeat units are 1,9-nonanediamine repeat units and/or 2-methyl-1,8-octanediamine repeat units.

3. The polyamide resin composition of claim 2, wherein the polyamide resin (A) has an intrinsic viscosity of from 0.4 to 3.0 dl/g.

4. Molded articles comprising the polyamide resin composition of claim 3.

5. The polyamide resin composition of claim 2, further comprising from 0.1 to 50 parts by weight of a flame-retardant synergist (C) and/or from 0.1 to 200 parts by weight of a filler (D), relative to 100 parts of the polyamide resin (A) in the composition.

6. Molded articles comprising the polyamide resin composition of claim 2.

7. The polyamide resin composition of claim 1, wherein the polyamide resin (A) has an intrinsic viscosity of from 0.4 to 3.0 dl/g.

8. The polyamide resin composition of claim 7, further comprising from 0.1 to 50 parts by weight of a flame-retardant synergist (C) and/or from 0.1 to 200 parts by weight of a filler (D), relative to 100 parts of the polyamide resin (A) in the composition.

9. Molded articles comprising the polyamide resin composition of claim 7.

10. The polyamide resin composition of claim 1, further comprising from 0.1 to 50 parts by weight of a flame-retardant synergist (C) and/or from 0.1 to 200 parts by weight of a filler (D), relative to 100 parts of the polyamide resin (A) in the composition.

11. The polyamide resin composition of claim 10, wherein the flame-retardant synergist (C) is selected from the group consisting of antimony trioxide, antimony pentoxide, sodium antimonate, sodium oxide, tin oxide, zinc stannate, zinc oxide, iron oxide, magnesium hydroxide, calcium hydroxide, zinc borate, kaolin clay, and calcium carbonate.

12. The polyamide resin composition of claim 10, wherein the filler is a fibrous filler.

13. The polyamide resin composition of claim 12, wherein the fibrous filler has a mean length of 1 to 10 mm.

14. The polyamide resin composition of claim 10, wherein the filler is a powder.

15. The polyamide resin composition of claim 14, wherein the powder has a mean particle size of 1 to 100 μm.

16. The polyamide resin composition of claim 10, wherein the filler is surface treated.

17. Molded articles comprising the polyamide resin composition of claim 1.

18. The polyamide resin composition of claim 1, wherein the dicarboxylic acid repeat units (a) comprise from 75 to 100 mol % of a terephthalic acid repeat unit.

19. The polyamide resin composition of claim 1, wherein the dicarboxylic acid repeat units (a) comprise from 90 to 100 mol % of a terephthalic acid repeat unit.

20. The polyamide resin composition of claim 1, wherein the diamine repeat units (b) comprise from 75 to 100 mol % of a $C_{6-18}$ aliphatic alkylenediamine repeat unit.

21. The polyamide resin composition of claim 1, wherein the diamine repeat units (b) comprise from 90 to 100 mol % of a $C_{6-18}$ aliphatic alkylenediamine repeat unit.

22. The polyamide resin composition of claim 1, wherein dicarboxylic acid repeat units (a) comprise at most 10 mol % of an additional dicarboxylic acid unit.

23. The polyamide resin composition of claim 1, wherein the diamine repeat units (b) comprise at most 10 mol % of additional diamine units.

24. The polyamide resin composition of claim 1, wherein the polyamide resin (A) has terminal groups blocked with a terminal-blocking agent, and at least 10% of the terminal groups are blocked with the terminal-blocking agent.

25. The polyamide resin composition of claim 1, wherein the polybromostyrene having an epoxy group has an epoxy-containing repeat unit content of 0.05 to 20 mol %, based on the total moles of repeat units of the polybromostyrene having an epoxy group.

26. The polyamide resin composition of claim 1, wherein the polybromostyrene (B) has a bromine content of 50 to 80% by weight, based on the total weight of the polybromostyrene (B).

* * * * *